(12) United States Patent
Reed (10) Patent No.: US 10,172,303 B2
(45) Date of Patent: Jan. 8, 2019

(54) AIRFOILS ON PIVOT IRRIGATION TOWER SYSTEMS

(71) Applicant: Berneil L. Reed, Holdrege, NE (US)

(72) Inventor: Berneil L. Reed, Holdrege, NE (US)

( * ) Notice: Subject to any disclaimer, the term of this patent is extended or adjusted under 35 U.S.C. 154(b) by 167 days.

(21) Appl. No.: 14/995,893

(22) Filed: Jan. 14, 2016

(65) Prior Publication Data

US 2016/0212951 A1    Jul. 28, 2016

Related U.S. Application Data

(60) Provisional application No. 62/107,770, filed on Jan. 26, 2015.

(51) Int. Cl.
| | | |
|---|---|---|
| *A01G 25/09* | (2006.01) | |
| *E02D 5/56* | (2006.01) | |
| *E02D 7/22* | (2006.01) | |
| *E02D 5/80* | (2006.01) | |

(52) U.S. Cl.
CPC ............ *A01G 25/092* (2013.01); *E02D 5/56* (2013.01); *E02D 5/80* (2013.01); *E02D 7/22* (2013.01)

(58) Field of Classification Search
CPC .......... A01G 25/092; E02D 5/80; E02D 7/22; E02D 5/56
USPC ............. 239/166, 172, 288–288.5, 104, 146; 296/180.1–209
See application file for complete search history.

(56) References Cited

U.S. PATENT DOCUMENTS

| | | |
|---|---|---|
| 3,618,859 A | 11/1971 | Watts |
| 3,724,758 A | 4/1973 | Fizmaurice |
| 3,726,266 A | 4/1973 | Williams |
| 4,191,206 A | 3/1980 | Baker |
| 4,352,464 A | 10/1982 | Cornelius et al. |
| 7,303,157 B1 | 12/2007 | Fixemer |
| 7,438,243 B1 | 10/2008 | Erickson |
| 8,317,114 B1 * | 11/2012 | Malsam ............... A01G 25/092 239/729 |
| 2010/0219296 A1 * | 9/2010 | Shelman-Cohen ....... B63B 1/34 244/130 |
| 2013/0240007 A1 * | 9/2013 | Ashton ................... E04H 15/58 135/161 |
| 2013/0090772 A1 | 11/2013 | Pfrenger |
| 2015/0097062 A1 * | 4/2015 | Frager .................. A01G 25/092 239/726 |

* cited by examiner

*Primary Examiner* — Darren W Gorman
*Assistant Examiner* — Qingzhang Zhou
(74) *Attorney, Agent, or Firm* — McKee, Voorhees & Sease, PLC (57) ABSTRACT

An improved pivot irrigation tower system is provided. The system includes a pivot operatively connected to a water source, a plurality of movable towers, a plurality of spans, and a plurality of sprinklers. One or more inverted airfoils are connected to, or incorporated into the design of, the pivot irrigation system to generate a downward force and/or to reduce drag on the system in response to the relative wind at a specific angle of attack. The system may include opposing pairs of inverted airfoils along a majority of the spans. The inverted airfoils may have means for removal of liquid from the top surfaces. The inverted airfoils may be rigidly and/or pivotally connected to the movable towers and/or the spans. The inverted airfoils may be designed with high camber and/or high camber angle. The quantity of the inverted airfoils may be greater at distances farther from the pivot.

20 Claims, 9 Drawing Sheets

AIRFOILS ON PIVOT IRRIGATION TOWER SYSTEMS

FIELD OF THE DISCLOSURE

The present disclosure relates generally to an airfoil pivot irrigation tower system. More particularly, but not exclusively, the disclosure relates to a pivot irrigation tower system with one or more inverted airfoils to generate a downward force under the influence of wind, thereby increasing the stability of the system.

BACKGROUND OF THE DISCLOSURE

A pivot tower irrigation system, also known as center-pivot irrigation, is a method of crop irrigation in which equipment rotates around a pivot while crops are watered by sprinklers. The equipment generally consists of a series of movable towers interconnected by spans with optional corner systems. In many pivot tower irrigations systems, the length of the system is one-quarter mile or longer, and the movable towers are powered by small electric, hydraulic, or water motors. Due to the size of the system, the drivetrain, and the weight of water supported over such a distance, there is significant interest in minimizing the weight of the movable towers and spans themselves. In many pivot tower irrigation systems, the components are made of lightweight steel or aluminum.

Each year invariably brings bouts of severe weather, including high winds. Due to the lightweight construction of the pivot irritation tower system, the high winds may produce sufficient force to topple the movable towers and spans. The resulting impact causes extraordinary damage to the lightweight components, resulting in detrimental financial burdens for farmers and insurance carriers, both in terms of repairing and/or replacing the structure(s), downtime in operations, and/or loss of crop due to lack of water. Therefore, a need exists in the art for an improved pivot irrigation tower system with increased stability under the influence of high winds.

Through analysis of various pivot tower models, it has been determined that the main cause of tipping of pivot tower irrigation systems in strong straight line winds is the excessive drag of the structure high above the ground. This drag is a function of the various components of the structure, with the ground span pipe or tube contributing more than 50% of the drag. The worst case scenario arises when the straight line winds are perpendicular to the span. Also, as the height of the pivot tower system increases, the movement from drag increases. Also, the longer the span, the higher the destabilizing force from strong winds. Conversely, the higher the weight or down force for the structure, the higher wind speed which can be withstood before the structure tips.

SUMMARY OF THE DISCLOSURE

It is therefore a primary object, feature, and/or advantage of the present disclosure to improve on or overcome the deficiencies in the art.

It is another object, feature, and/or advantage of the present disclosure to install a series of specifically designed inverted airfoils to generate a downward force under the influence of wind (i.e., the relative wind in reference to the airfoil).

It is another object, feature, and/or advantage of the present disclosure to provide pairs of opposing inverted airfoils. The pairs of opposing inverted airfoils accommodate different wind directions and/or changing wind directions.

It is yet another object, feature, and/or advantage to increase the number of inverted airfoils along the pivot tower irrigation system at a greater distance from the pivot. The movable towers and spans farther from the pivot are more susceptible to toppling. The increased number of inverted airfoils provides for greater downward force and stability in these areas.

It is still another object, feature, and/or advantage of the present disclosure to provide means for removal of liquid and/or debris from the top surface of the one or more inverted airfoils to maintain the aerodynamic properties and minimize the weight of the airfoils.

It is another object, feature, and/or advantage of the present disclosure to provide for a circular or oval inverted airfoil to provide the desired downward force independent of wind direction.

It is yet another object, feature, and/or advantage to provide for high camber, thin inverted airfoils to produce higher downward forces at lower wind speeds.

These and/or other objects, features, and advantages of the present disclosure will be apparent to those skilled in the art. The present disclosure is not to be limited to or by these objects, features and advantages. No single embodiment need provide each and every object, feature, or advantage.

According to an aspect of the disclosure, a pivot irrigation system is provided. The pivot irrigation system includes a pivot point operatively connected to a water source, a plurality of movable towers, and a plurality of spans having a truss system. The first span is connected to the center point, and the last span extends beyond the last tower. Each of the intermediate spans is connected to at least two of the towers. A plurality of sprinklers is operably connected to the pivot center and coupled to the plurality of spans. One or more inverted airfoils are connected to, or incorporated into the design of, the pivot irrigation system. Each of the inverted airfoils has a camber, a camber angle, a top surface, a bottom surface, a centerline, a leading edge and a trailing edge. Wind passing across the inverted airfoils generates a downward force on the pivot irrigation system.

According to another an aspect of the disclosure, the system may also include an opposing pair of the inverted airfoils. The leading edge of one of the opposing pair of inverted airfoils is oriented in an opposite direction as the leading edge of another of the opposing pair of the inverted airfoils. Further, the quantity of the inverted airfoils may be greater as to the distance from the pivot point increases.

The inverted airfoils may have means for removal of liquid from the top surface of the airfoils. One or more of the inverted airfoils may be circular. The inverted airfoils may be rigidly or pivotally connected to the movable towers and/or the spans. The inverted airfoils may be designed with high camber and/or high camber angle.

BRIEF DESCRIPTION OF THE DRAWINGS

Illustrated embodiments of the disclosure are described in detail below with reference to the attached drawing figures, which are incorporated by reference herein, and where:

FIG. 9 is a sketch from a side view showing the inverted wing with the span tube extending there through.

DETAILED DESCRIPTION OF THE PREFERRED EMBODIMENTS

Figure 1:
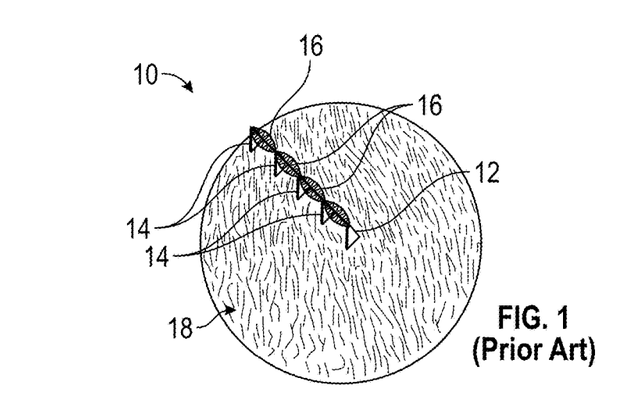
FIG. 1 is a top plan view of a conventional pivot tower irrigation system.

FIG. 1 illustrates a typical pivot tower irrigation system 10. The pivot tower irrigation system 10 includes a pivot 12 and a plurality of movable towers 14 connected by a plurality of spans 16. In operation, the movable towers 14 and spans 16 rotates about the pivot 12 and irrigates crops in a circular area 18 with a radius approximately equal to the length of the pivot tower irrigation system 10.

Figure 2:
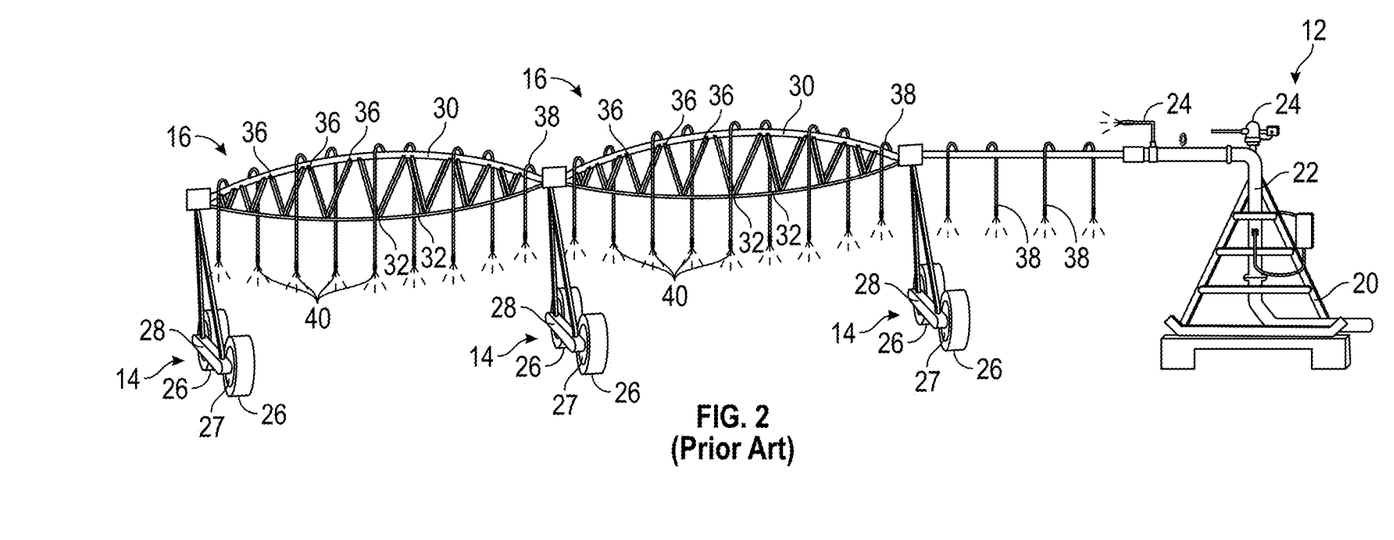
FIG. 2 is a perspective view of a conventional pivot tower irrigation system.

Referring to FIG. 2, the pivot 12 generally includes a support structure 20 and piping 22. The pivot 12 is in fluid connection with a liquid source (not shown) such as a natural reservoir or a vessel. In most instances, the liquid is water. In other instances, the liquid can be fertilizer or herbicide. The pivot 12 is operably connected to a pump which pumps water from the liquid source to the remainder of the system 10. As shown illustratively in FIG. 2, the piping 22 delivers water to sprinklers 40 on the spans 16 elevated over the field. Elevating the spans 16 and sprinklers 40 is important to provide for better water dispersion and/or reduce crop damage. The pivot 12 may also have one or more valves 24 to control water flow. A horizontal top portion of the piping 22 is adapted to rotate about a vertical axis of the support structure 20 as the system 10 is in operation.

Each tower 14 includes a frame assembly 28 mounted on a plurality of wheels 26. One or more of the wheels 26 may be operably connected to a motor 27 to drive the wheels and move the pivot tower irrigation system 10 about the pivot 12. The motor 27 can be powered by electricity, hydraulic fluid, or water, or any other means commonly known in the art.

One span 16 is disposed between each pair of the movable towers 14. Each span 16 has a pipeline 30 preferrably tracking centrally along the length of the span 16. The pipeline 30 may provide a portion of the strength to the span 16. Moreover, the pipeline 30 is the primary conduit for the water received from the water source along the length of the system 100. Each span 16 includes a truss structure 36 providing further structural support to span 16. In one embodiment, the truss structure 36 includes two curvilinear members extending between two movable towers 14. The two curvilinear members may be connected to one another and to the pipeline 30 by a plurality of support members. Extending downwardly from the pipeline 30 is a plurality of down drops 38, also known as goosenecks. The down drops 38 fluidly connect the pipeline 30 to the sprinklers 40.

The pivot tower irrigation system 10, described above and shown in FIGS. 1 and 2 is conventional, and may take other forms without departing from the scope of the invention, as described below.

Figure 3A:
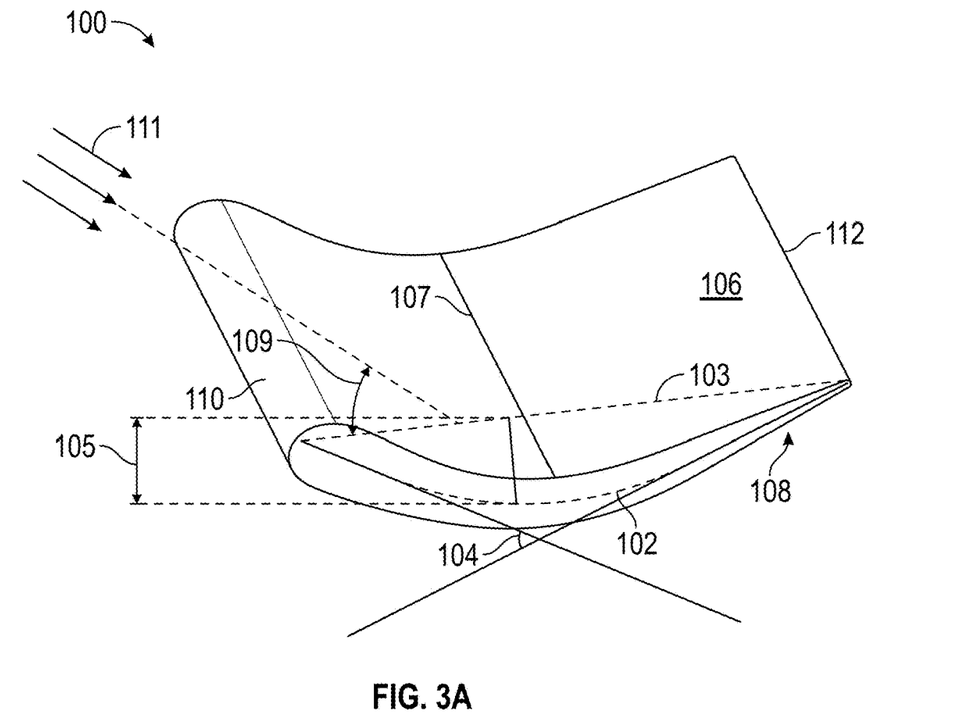
FIG. 3A is a front perspective view of an inverted airfoil having a wing shape, in accordance with an illustrative embodiment.
Figure 3B:
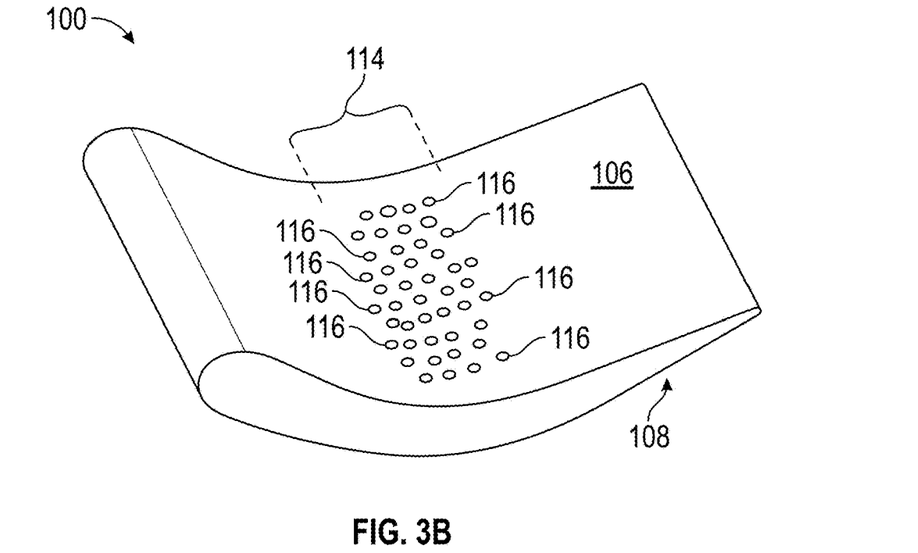
FIG. 3B is a front perspective view of another inverted airfoil having a wing shape, in accordance with an illustrative embodiment.

The invention is directed to one or more inverted airfoils or wings 100 which are provided on the irrigation system 10. Examples of two embodiments of airfoils are shown in FIGS. 3A and 3B. The inverted airfoil 100 includes a top surface 106 and a bottom surface 108. The inverted airfoil 100 further includes a leading edge 110 and trailing edge 112. The leading edge 110 may be curvilinear to provide for the desired aerodynamic properties, as commonly known in aerodynamic design. The airfoil 100 tapers towards the trailing edge 112, as commonly known in aerodynamics. A transverse centerline 107 may be defined as a straight line from opposing lateral edges of the inverted airfoil 100 one-half the distance between the leading edge 110 and the trailing edge 112.

A chord line 103 may be associated with the airfoil 100 and comprise a straight line between the leading edge 110 and the trailing edge 112. The chord line 103 defines the length of the airfoil or wing 100. The chord line 103 is often used as a reference line for aerodynamic measurements and used in aerodynamic calculations of airfoil properties.

The inverted airfoil 100 may include a camber line 102 comprised of a line one-half the distance between the upper surface 106 and lower surface 108 along the length of the inverted airfoil 100. The inverted airfoil 100 may further include camber 105 comprised of the distance between the camber line 102 and the chord line 103. Camber is typically designed into an airfoil to increase lift coefficient. In an exemplary embodiment, an inverted airfoil 100 is designed with high camber to maximize the downward force produced by the inverted airfoil 100, particularly at lower wind speeds. The inverted airfoil 100 may also be associated with a camber angle 104, comprised of the angle between a line tangent to the camber line 102 at the leading edge and a line tangent to the camber line 110 at the trailing edge 112, as shown illustratively in FIG. 3A. The camber angle 104 is associated with the overall curvature of the inverted airfoil 100 and related to camber 105 along the length of the airfoil. In an exemplary embodiment, the camber angle 104 is between sixty and one hundred degrees; however, the camber may be of any angle necessary to achieve the objects of this invention.

Due to the inversion of the airfoil and the desire for high camber in an exemplary embodiment, a depression 114 may be associated with the inverted airfoil 100, as shown illustratively in FIG. 3B. As a result, unwanted debris, and more particularly standing water due to precipitation, may collect on the top surface 106 of the inverted airfoil 100. The standing water may undesirably increase the weight of the inverted airfoil 100 and/or decrease the aerodynamic properties of the same. To remove standing water, the present disclosure envisions means for removal of liquid from the top surface 106 of the inverted airfoil 100. In the illustrative embodiment of FIG. 3B, means may include a plurality of holes 116 extending from the top surface 106 to the bottom surface 108. The holes 116 may be disposed anywhere on the top surface 106 and/or concentrated in the depression 114. The holes 116 may be of any size and/or shape to permit water and/or debris to pass through, but may also be of proper size and shape to maintain the aerodynamic properties of the inverted airfoil 100. In another exemplary embodiment, the top surface 106 may include one or more graded surfaces extending from a center of the top surface 106 to the opposing lateral edges of the inverted airfoil 100. The graded surfaces permit the water and/or debris to flow off one or both of the opposing lateral edges due to the force of gravity. In yet another exemplary embodiment, the inverted airfoil 100 may be mounted on the pivot tower irrigation system 100, which is discussed in detail below, at a slight angle to permit the water and/or debris to flow off one the opposing edges due to the force of gravity. In still yet another exemplary embodiment, a pumping mechanism may be installed to remove standing water and/or debris from the top surface 106 of the inverted airfoil 100.

Figure 4A:
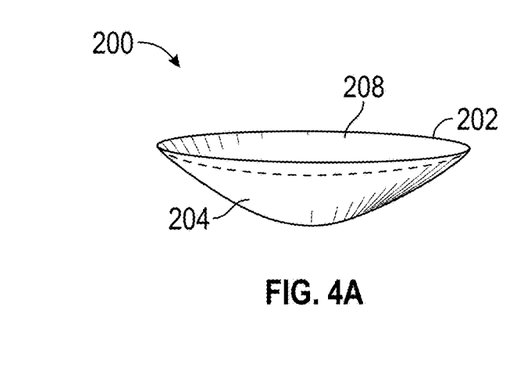
FIG. 4A is a front perspective view of a circular or oval inverted airfoil having a concave upper surface, in accordance with an illustrative embodiment.
Figure 4B:
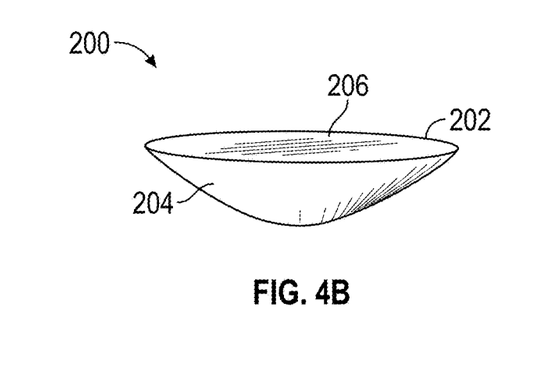
FIG. 4B is a front perspective view of another circular or oval inverted airfoil having a flat upper surface, in accordance with an illustrative embodiment.

Referring to FIGS. 4A and 4B, two exemplary embodiments of a circular inverted airfoil 200 are illustrated. The circular inverted airfoil 200 includes a circular perimeter 202 and a generally dome-shaped lower surface 204. The lower surface 204 may be of any size and/or shape to impart the desired aerodynamic properties of the circular inverted airfoil 200, similar to the inverted airfoil 100 discussed above. In the exemplary embodiment of FIG. 4A, a concave top surface 208 may extend inwardly into the circular or oval inverted airfoil 200, akin to the high camber embodiment of the inverted airfoil 100 discussed above. The concave top surface 208 may also include the means for removal of water and/or debris discussed above. In the exemplary embodiment of FIG. 4B, a flat top surface 206 is disposed within the circular perimeter 202. In another exemplary embodiment, a top surface can be convex. In all embodiments, the circular perimeter 202 of the circular inverted airfoil 200 generates the desired downward force on the pivot irrigation tower system 100, regardless of the direction of the wind.

Figure 5A:
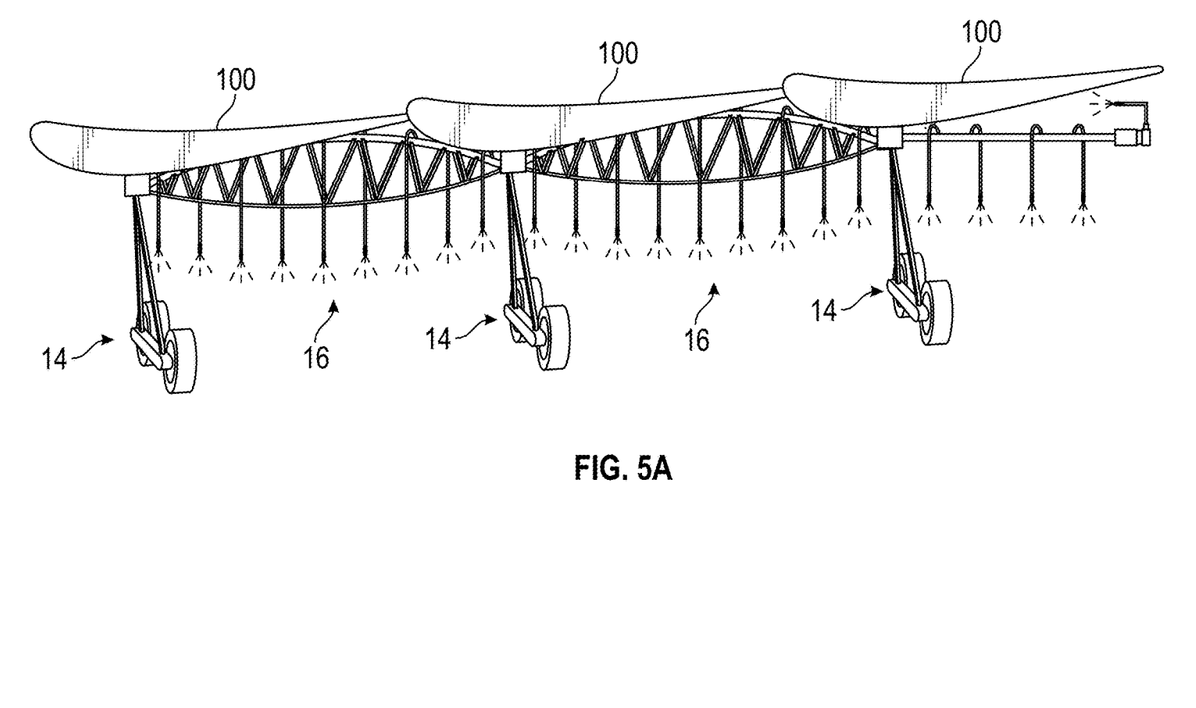
FIG. 5A is a perspective view of a pivot irrigation tower system with wing-shaped airfoils, in accordance with an illustrative embodiment.
Figure 5B:
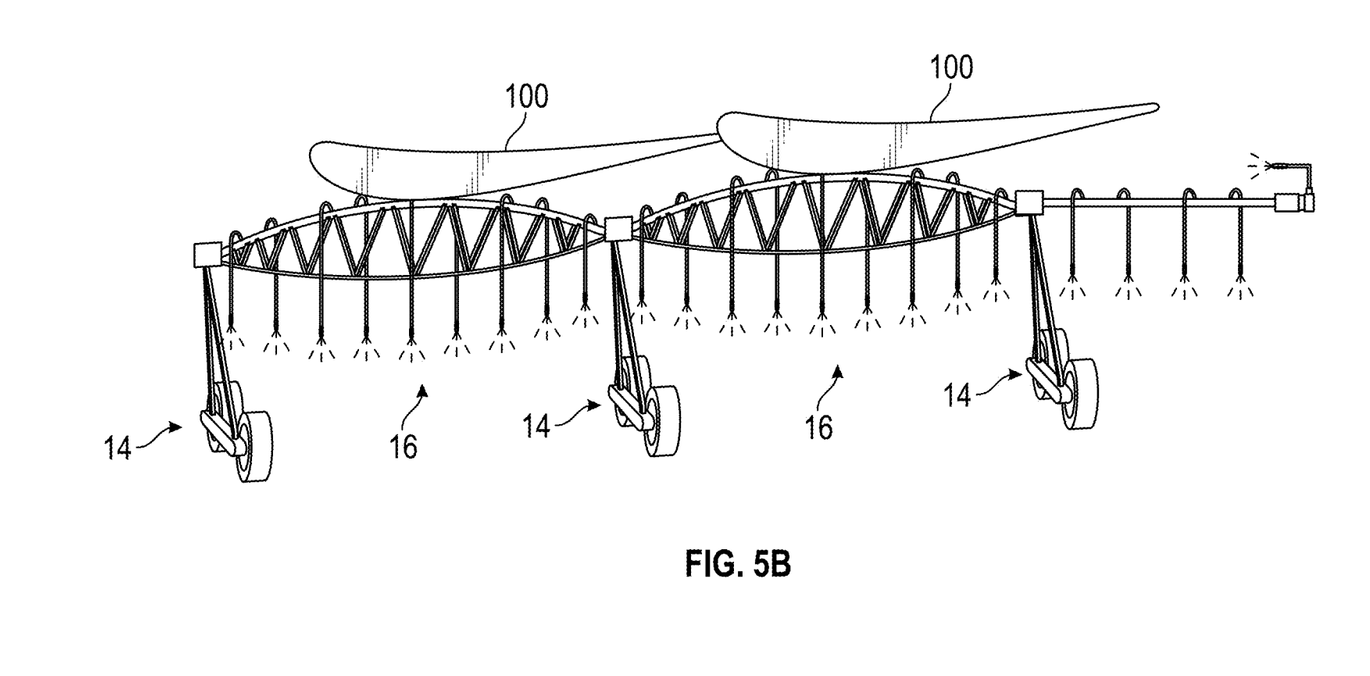
FIG. 5B is a perspective view of a second pivot irrigation tower system with wing-shaped airfoils, in accordance with an illustrative embodiment.
Figure 5C:
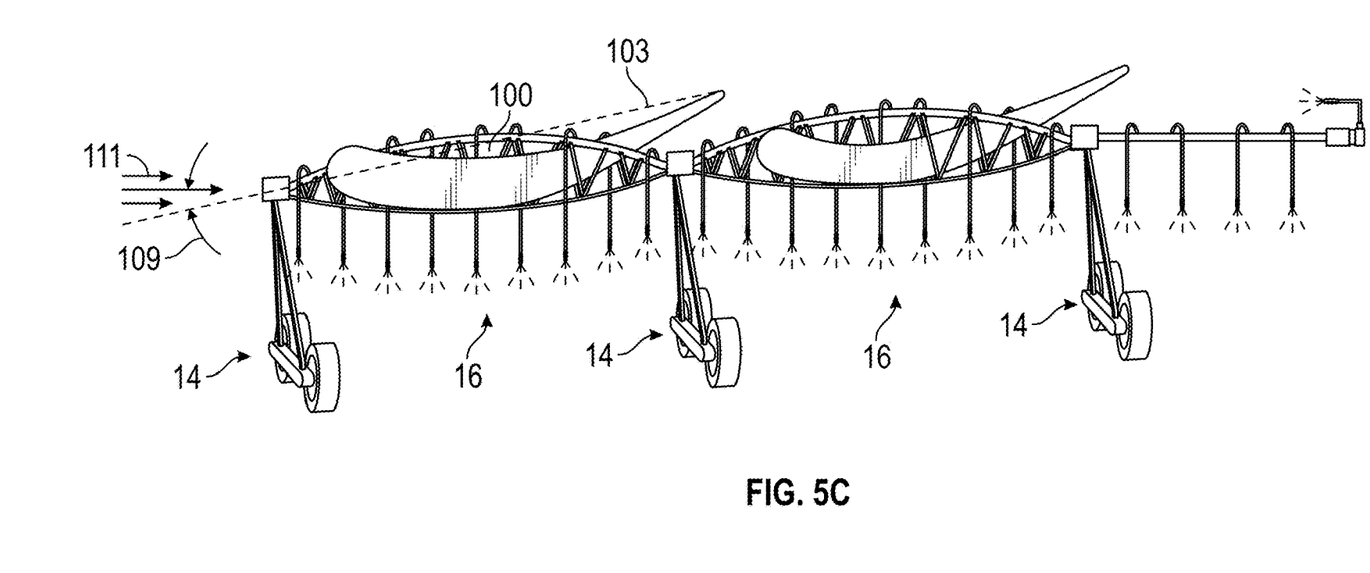
FIG. 5C is a perspective view of a third pivot irrigation tower system with wing-shaped airfoils, in accordance with an illustrative embodiment.
Figure 5D:
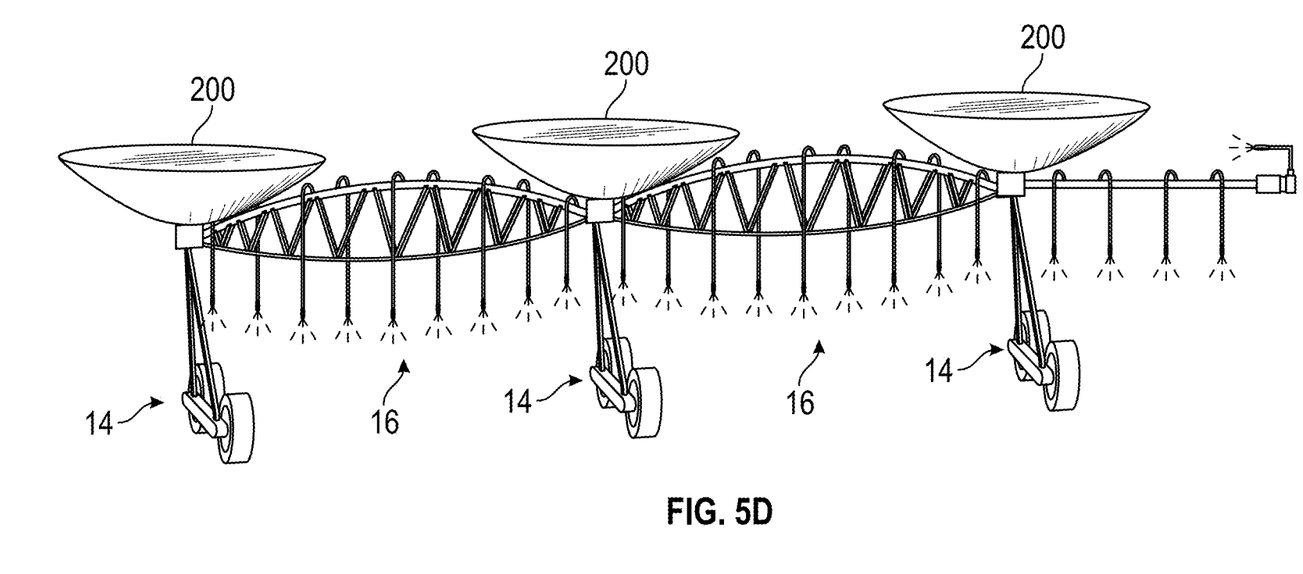
FIG. 5D is a perspective view of a fourth pivot irrigation tower system with circular or oval airfoils, in accordance with an illustrative embodiment.

Consistent with the objects of the disclosure, the inverted airfoil 100 and/or circular inverted airfoil 200 are installed on the pivot irrigation tower system 10, as shown illustratively in FIGS. 5A, 5B, 5C and 5D. The inverted airfoil 100 and/or circular inverted airfoil 200 may be installed on the movable towers 14 (FIG. 5A and 5D) and/or on the spans 16 (FIG. 5B and 5C). Each inverted wing airfoil 100 and/or circular airfoil 200 may be secured via any securing means commonly known in the art, including but not limited to brackets, nut and bolts, screws, welding, pinning, clamping, and the like.

The inverted airfoils 100, 200 may be rotatably connected to the movable tower 14 and/or of the span 16. The preferred location of the airfoils 100, 200 is on the spans 16. The rotatably connected airfoils 100 may be manually or automatically (e.g., computer control system) rotated about a vertical axis to orient the leading edge 110 of the inverted airfoil 100 into oncoming wind. The circular inverted airfoils 200 effectively have a 360° leading edge extending continuously around the perimeter 200, such that rotation is unnecessary.

The inverted wing airfoils 100 and/or circular airfoils 200 may also be pivotally connected to a movable tower 14 and/or the pipeline 30 of the span 16 and manually or automatically pivoted about a horizontal axis to orient the leading edges of the airfoils to a desired angle of attack 109. Referring to FIGS. 3A and 5C, the angle of attack 109 may be defined as the angle between the chord line 103 of the inverted airfoil 100 and the direction of oncoming wind 111. As commonly known in the art of aerodynamics, increasing the angle of attack is associated with increasing the lift coefficient up to the maximum lift coefficient, after which lift coefficient decreases. The angle of attack may be between approximately fifteen and twenty degrees to maximize the generated downward force, particularly at low wind speeds, but the angle of attack may be any angle to achieve the objects of this disclosure.

In an exemplary embodiment, the inverted airfoil 100 and/or circular inverted airfoil 200 may be installed within the truss structure 36 of the span 16, as shown illustratively in FIG. 5C. In such an embodiment, the inverted airfoil 100 and/or circular inverted airfoil 200 may include openings extending through the airfoils to accommodate the truss structure 36. Installing the inverted airfoil 100 and/or circular inverted airfoil 200 within the truss structure 36 may provide for more points of connection and/or more structural integrity of the airfoil on the span 16. Further, the openings may also serve as means for water and/or debris removal, consistent with the disclosure above.

In addition to installing and/or retrofitting the inverted airfoil 100 and/or circular inverted airfoil 200 on the pivot irrigation tower system 100, the placement of airfoils on the system may be integrated into the design. In such an embodiment, the inverted airfoil 100 and/or circular inverted airfoil 200 may envelop the span 16, similar to the embodiment illustrated in FIG. 5C. The design of the inverted airfoil 100 and/or circular inverted may be based, at least in part, on the dimensions and/or attributes of the movable tower 14 and/or the span 16.

Figure 6:
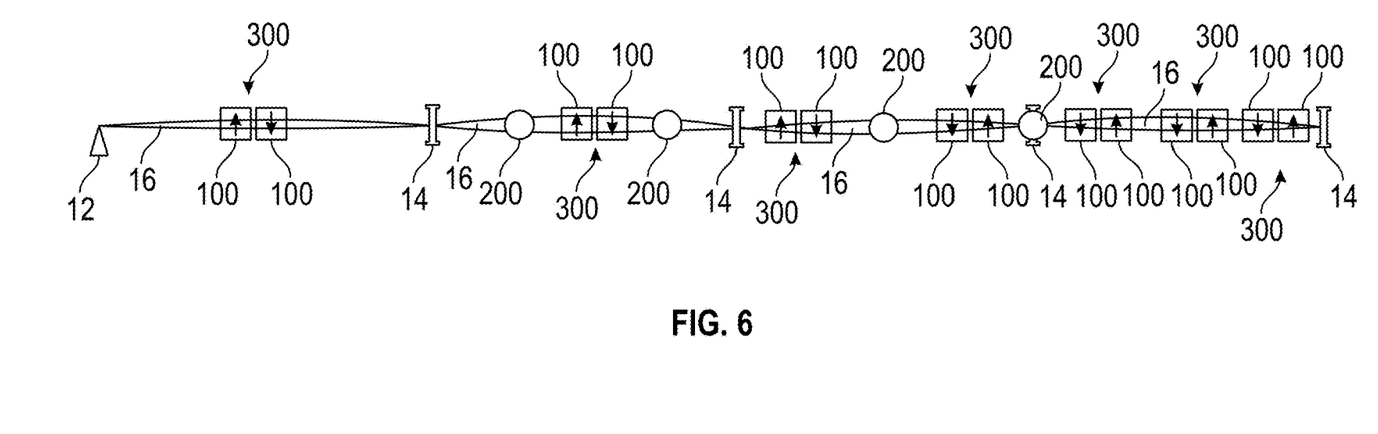
FIG. 6 is a top plan view of a pivot irrigation tower system with both wing-shaped and circular airfoils, in accordance with an illustrative embodiment.

FIG. 6 illustrates a pivot irrigation tower system 100 with airfoils in accordance with an exemplary embodiment. In particular, opposing pairs 300 of inverted airfoils 100 may be included along the length of the pivot irrigation tower system 100. Whereas one inverted airfoil 100 generates downward force for wind passing over the airfoil from the leading edge 110 to the trailing edge 112 (FIG. 3A), opposing pairs 300 of inverted airfoils 100 generate a downward force in response to both directions of wind producing the most force against the pivot irrigation tower system 100. The inverted airfoils 100, circular inverted airfoils 200 and/or opposing pairs 300 may be designed not to structurally damage the system due to the downward forces generated by the inverted airfoils.

Any combination of the inverted airfoils 100, circular inverted airfoils 200 and opposing pairs 300 may be utilized in the pivot irrigation tower system 100, as shown illustratively in FIG. 6. Further, as discussed above, any one or more airfoils from the combination may be installed on the movable towers 14, on the spans 16, and/or within the spans 16.

Furthermore, the number of inverted airfoils 100, circular inverted airfoils 200 and/or opposing pairs 300 may increase at a distance farther from the pivot 12. As the pivot 12 is often rigidly connected to the ground, the span 16 closest the pivot 12 is at least partially supported by the pivot 12 when exposed to wind. By contrast, the span 16 farthest from the pivot 12, which may be nearly one-quarter mile in distance, receives no such direct support from the pivot 12 and further is influenced by the movement and/or unsteadiness of the intervening spans 16. Therefore, installation of additional inverted airfoils 100, circular inverted airfoils 200 and/or opposing pairs 300 on or within the spans 16 farthest from the pivot 12, as shown illustratively in FIG. 6, may generate additional downward force necessary to overcome the forces from wind on the terminal spans 16 of the pivot tower irrigation system 100.

Figure 7:
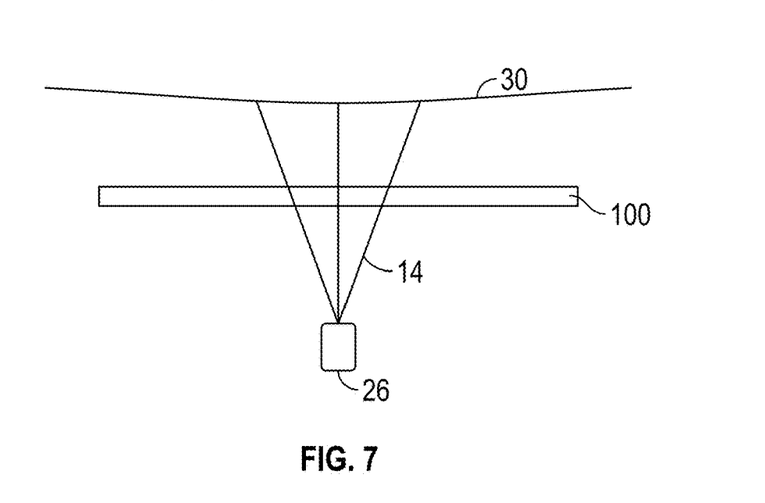
FIG. 7 is a sketch showing a simplified front view of a pivot irrigation tower system having the inverted wing of the present invention mounted beneath the span tubes.
Figure 8:
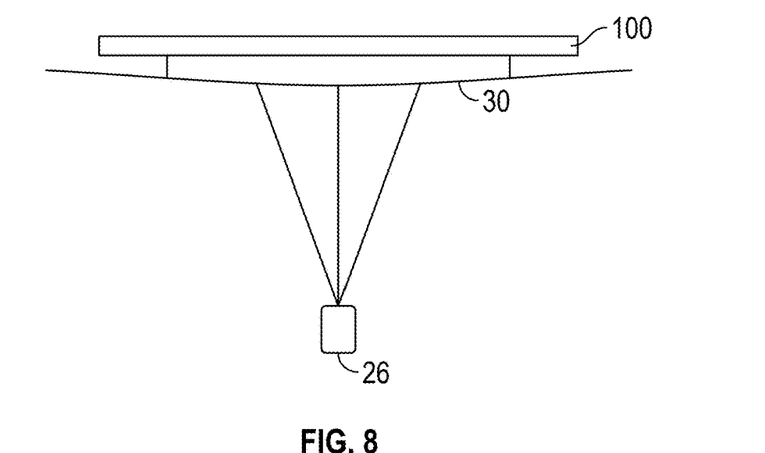
FIG. 8 is a view similar to FIG. 7 showing the inverted wing above the span tube.
Figure 9:
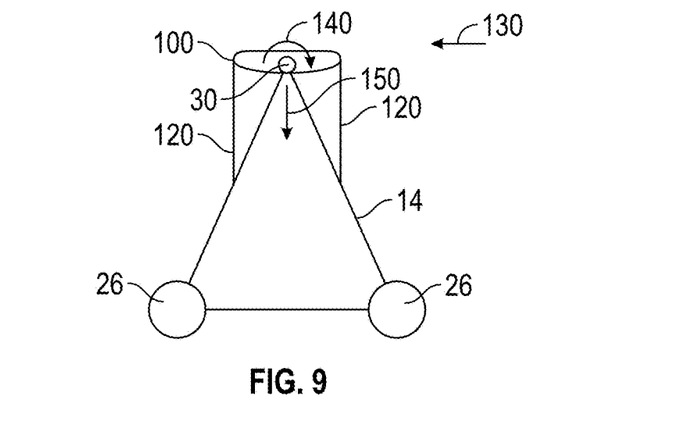

It is understood that the airfoil 100 of the present invention can be mounted in various positions on the pivot irrigation tower system 10, in accordance with the present invention. For example, as seen in FIG. 7, the airfoil 100 can be mounted below the span tube or pipeline 30. Alternatively, as shown in FIG. 8, the airfoil 100 can be mounted above the span tube or pipeline 30. In yet another alternative, the pipeline 30 can extend through the airfoil 100, as shown in FIG. 9. As further shown in FIG. 9, struts 120 can extend between the tower 14 and the airfoil 100 to provide structural integrity and rigidity. The struts 120 can be used with any of the locations of the airfoil, as seen in FIGS. 7-9.

Figure 10:
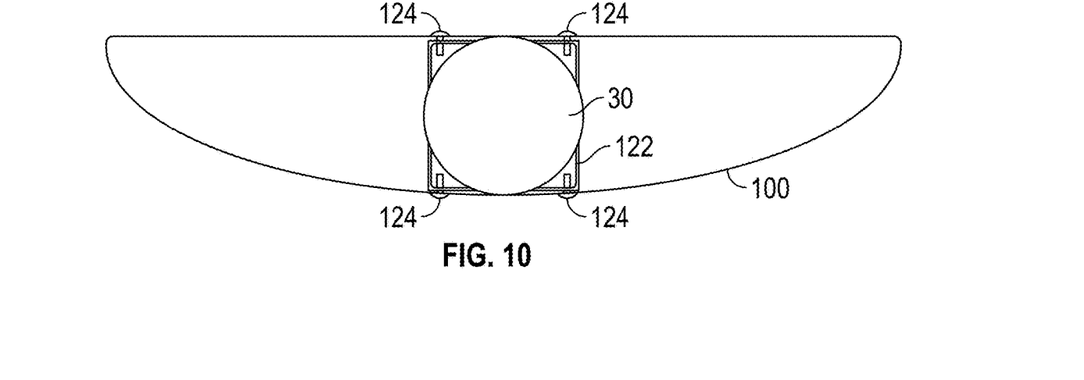
FIG. 10 is a sectional view showing a preferred embodiment of a mounting bracket for supporting the span tube inside the airfoil.

FIG. 10 shows further detail of the pipeline 30 mounted internally within the airfoil 100. In this alternative, a mounting bracket 122 extends around the pipeline 30 and is secured to airfoil 100 by a plurality of fasteners 124. The airfoil 100 also reduces wind-generated drag on the pipeline 30.

FIG. 9 also schematically shows the forces on the irrigation system 10. The wind designated by the arrow 130 passes over the airfoil 100, thereby creating a pitching moment, designated by the arrow 140, and a down force designated by the arrow 150.

Figure 11:
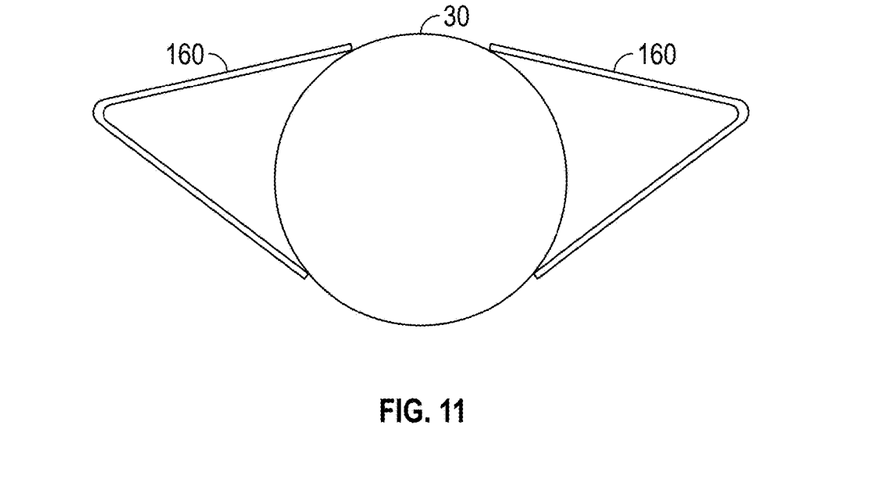
FIG. 11 is a sectional view showing an alternative airfoil created by opposing fairings fixed to the span tube.

A further alternative embodiment of the invention is shown in FIG. 11, wherein opposite fairings 160 are fixed to the span tube or pipeline 30. Fairings 160 effectively create an airfoil to generate a down force, while also reducing wind-induced drag on the pipeline 30. The fairings 160 are an alternative to the airfoil 100 shown in FIG. 10.

The disclosure is not to be limited to the particular embodiments described herein. In particular, the disclosure contemplates numerous variations in the type of ways in which embodiments of the disclosure may be applied to pivot irrigation tower system with inverted airfoils. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions may be made, which are within the intended spirit and scope of the disclosure.

For example, while FIGS. 5A-C show an elongated airfoil associate with each span of the irrigation system, it is understood that multiple smaller airfoils can be used with each span. Also, as another alternative to the airfoil mountings shown in the drawings, the airfoils could be mounted beneath the span in a position which does not interfere with the sprinklers. The orientation of the wing airfoil leading edge relative to the span can also be varied from the orientation shown in the drawings, without departing from the scope of the invention.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An airfoil pivot irrigation tower system comprising:
   a pivot irrigation system having:
   a. a pivot operatively connected to a center point;
   b. movable towers;
   c. spans having a truss system, the spans connected to at least two of the movable towers;
   d. sprinklers operably connected to the pivot and coupled to the spans; and
   at least one pair of opposing inverted airfoils alternating along a length of the spans and connected to the pivot irrigation system, each of the inverted airfoils having a camber, a camber angle, a top surface, a bottom surface, a centerline, a leading edge, an angle of attack, and a trailing edge;
   wherein the inverted airfoils prevent toppling of the pivot irrigation system in high wind conditions.

2. The airfoil pivot irrigation tower system of claim 1 wherein the inverted airfoils are designed based in part on dimensions of the spans.

3. The airfoil pivot irrigation tower system of claim 1, wherein the leading edges of the inverted airfoils are oriented in opposite directions and the centerlines of the inverted airfoils are substantially parallel to one another.

4. The airfoil pivot irrigation tower system of claim 1, further comprising:
   a first distance from the pivot;
   a second distance from the pivot, the second distance being greater than the first distance; and
   wherein a quantity of the inverted airfoils is greater proximate to the second distance than a quantity of the inverted airfoils proximate to the first distance.

5. The airfoil pivot irrigation tower system of claim 1 further comprising a means for removing liquid from the top surface of the inverted airfoils.

6. The airfoil pivot irrigation tower system of claim 1 wherein the inverted airfoils are mounted on the movable towers.

7. The airfoil pivot irrigation tower system of claim 1 wherein the inverted airfoils are mounted on the spans.

8. The airfoil pivot irrigation tower system of claim 1, further comprising:
   down drops extending outwardly from the spans, the down drops fluidly connected to a water source and the sprinklers;
   openings in the inverted airfoils adapted to provide a passageway for the down drops through the inverted airfoils.

9. The airfoil pivot irrigation tower system of claim 1 wherein the inverted airfoils are rotatably connected to the pivot irrigation system to selectively position the leading edge about a vertical axis.

10. The airfoil pivot irrigation tower system of claim 9 wherein the inverted airfoils are selectively pivotal about a horizontal axis to alter the angle of attack.

11. The airfoil pivot irrigation tower system of claim 1 wherein the angle of attack is between fifteen and twenty degrees.

12. A method of stabilizing a pivotal tower irrigation system against toppling by winds, the method comprising:
   providing the airfoil pivot irrigation tower system of claim 1; and generating an aerodynamic downward force on the movable towers via the inverted airfoils.

13. The method of claim 12 further comprising rotating the inverted airfoils so that the leading edge is facing into the wind.

14. The method of claim 12 further comprising pivoting the inverted airfoils to alter the angle of attack.

15. The method of claim 12 wherein the inverted airfoils are mounted on the movable towers.

16. The method of claim 12 wherein the inverted airfoils are mounted on the spans.

17. The method of claim 12 further comprising utilizing the inverted airfoils along a length of the irrigation system.

18. The method of claim 12 further comprising generating a drag reducing aerodynamic force on the spans by positioning the inverted airfoils and opposing fairings on the irrigation system so as to minimize wind-induced drag.

19. The airfoil pivot irrigation tower system of claim 1 wherein the spans comprise a pipeline for receiving water from the water source and further wherein opposite fairings are fixed to the pipeline to reduce wind-induced drag.

20. The airfoil pivot irrigation tower system of claim 8 wherein the spans comprise a pipeline for receiving water from the water source along the length of the pivot irrigation system and further wherein the down drops extend downwardly from the pipeline.

* * * * *